(12) United States Patent
Lillibridge et al.

(10) Patent No.: US 7,831,573 B2
(45) Date of Patent: Nov. 9, 2010

(54) SYSTEM AND METHOD FOR COMMITTING TO A SET

(75) Inventors: Mark David Lillibridge, Mountain View, CA (US); Rajan Mathew Lukose, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1306 days.

(21) Appl. No.: 10/934,557

(22) Filed: Sep. 3, 2004

(65) Prior Publication Data

US 2005/0038774 A1 Feb. 17, 2005

Related U.S. Application Data

(63) Continuation-in-part of application No. 10/639,140, filed on Aug. 12, 2003, now abandoned.

(51) Int. Cl.
G06F 17/30 (2006.01)
(52) U.S. Cl. ..................................................... 707/698
(58) Field of Classification Search .................. 707/100, 707/101, 103 R
See application file for complete search history.

(56) References Cited

U.S. PATENT DOCUMENTS

| | | | |
|---|---|---|---|
| 5,754,938 A | 5/1998 | Herz et al. |
| 5,794,210 A | 8/1998 | Goldhaber et al. |
| 5,848,396 A | 12/1998 | Gerace |
| 5,857,175 A | 1/1999 | Day et al. |
| 5,933,811 A | 8/1999 | Angles et al. |
| 5,974,398 A | 10/1999 | Hanson et al. |
| 5,987,252 A | 11/1999 | Leino et al. |
| 5,991,734 A | 11/1999 | Moulson |
| 6,047,327 A | 4/2000 | Tso et al. |
| 6,085,216 A | 7/2000 | Huberman et al. |
| 6,108,639 A | 8/2000 | Walker et al. |

(Continued)

FOREIGN PATENT DOCUMENTS

WO WO-97/17774 5/1997

(Continued)

OTHER PUBLICATIONS

Martel, Chip et al., "A General Model for Authenticated Data Structures," Dec. 6, 2001, UC Davis Department of Computer Science, pp. 1-18.*

(Continued)

*Primary Examiner*—Neveen Abel Jalil
*Assistant Examiner*—Farhan M Syed

(57) ABSTRACT

The disclosed embodiments relate to a system and method of committing to a data set, comprising forming a directed acyclic graph adapted to encode the data set, the directed acyclic graph having a plurality of pointers and a plurality of nodes wherein at least one node has multiple parents, the directed acyclic graph having at least one root node and a plurality of leaf nodes. Further, disclosed embodiments comprise committing to the directed acyclic graph to produce a committed-to data set and producing a plurality of proofs about the committed-to data set such that a combination of the plurality of proofs does not reveal information about which nodes have multiple parents, each proof comprising a trace from one of the plurality of nodes to at least one different node, the trace comprising the identities of the nodes and pointers traversed.

49 Claims, 11 Drawing Sheets

U.S. PATENT DOCUMENTS

| | | |
|---|---|---|
| 6,182,050 B1 | 1/2001 | Ballard |
| 6,182,068 B1 | 1/2001 | Culliss |
| 6,195,698 B1 | 2/2001 | Lillibridge et al. |
| 6,199,067 B1 | 3/2001 | Geller |
| 6,324,519 B1 | 11/2001 | Eldering |
| 6,353,925 B1 | 3/2002 | Stata et al. |
| 6,396,833 B1 | 5/2002 | Zhang et al. |
| 6,539,377 B1 | 3/2003 | Culliss |
| 6,546,390 B1 | 4/2003 | Pollack et al. |
| 6,560,588 B1 | 5/2003 | Minter |
| 6,567,507 B1 | 5/2003 | Shaffer et al. |
| 6,614,764 B1 | 9/2003 | Rodeheffer et al. |
| 6,618,814 B1 | 9/2003 | Gaur et al. |
| 6,654,743 B1 | 11/2003 | Hogg et al. |
| 6,665,710 B1 | 12/2003 | Bates et al. |
| 6,670,964 B1 | 12/2003 | Ward et al. |
| 6,681,059 B1 | 1/2004 | Thompson |
| 6,718,365 B1 | 4/2004 | Dutta |
| 6,721,275 B1 | 4/2004 | Rodeheffer et al. |
| 6,735,589 B2 | 5/2004 | Bradley et al. |
| 6,738,978 B1 | 5/2004 | Hendricks et al. |
| 6,771,290 B1 | 8/2004 | Hoyle |
| 6,832,207 B1 | 12/2004 | Shkedi |
| 6,834,195 B2 | 12/2004 | Brandenberg et al. |
| 6,850,247 B1 | 2/2005 | Reid et al. |
| 6,937,291 B1 | 8/2005 | Gryskiewicz |
| 6,938,021 B2 | 8/2005 | Shear et al. |
| 6,983,311 B1 | 1/2006 | Haitsuka et al. |
| 7,010,176 B2 | 3/2006 | Kusunoki |
| 7,034,848 B2 | 4/2006 | Sobol |
| 7,035,469 B2 | 4/2006 | Laaksonen |
| 7,061,509 B2 | 6/2006 | Dischert et al. |
| 7,064,867 B2 | 6/2006 | Lapstun et al. |
| 7,065,247 B2 | 6/2006 | Lapstun et al. |
| 7,130,841 B1 | 10/2006 | Goel et al. |
| 7,155,508 B2 | 12/2006 | Sankuratripati et al. |
| 7,260,573 B1 | 8/2007 | Jeh et al. |
| 7,305,691 B2 | 12/2007 | Cristofalo |
| 7,310,612 B2 | 12/2007 | McQueen et al. |
| 2001/0036224 A1 | 11/2001 | Demello et al. |
| 2001/0041566 A1 | 11/2001 | Xanthos et al. |
| 2001/0042132 A1 | 11/2001 | Mayadas |
| 2002/0048369 A1* | 4/2002 | Ginter et al. ............ 380/277 |
| 2002/0052778 A1 | 5/2002 | Murphy et al. |
| 2002/0082923 A1 | 6/2002 | Merriman et al. |
| 2002/0099605 A1 | 7/2002 | Weitzman et al. |
| 2002/0102992 A1 | 8/2002 | Koorapaty et al. |
| 2002/0124098 A1 | 9/2002 | Shaw |
| 2002/0138353 A1* | 9/2002 | Schreiber et al. .......... 705/26 |
| 2002/0156677 A1 | 10/2002 | Peters et al. |
| 2002/0178257 A1 | 11/2002 | Cerrato |
| 2003/0014304 A1 | 1/2003 | Calvert et al. |
| 2003/0023589 A1 | 1/2003 | Castle |
| 2003/0028451 A1 | 2/2003 | Ananian |
| 2003/0033199 A1 | 2/2003 | Coleman |
| 2003/0037041 A1 | 2/2003 | Hertz |
| 2003/0046244 A1 | 3/2003 | Shear et al. |
| 2003/0050839 A1 | 3/2003 | Shiomi |
| 2003/0110497 A1 | 6/2003 | Yassin et al. |
| 2003/0149572 A1 | 8/2003 | Newton et al. |
| 2003/0171995 A1 | 9/2003 | Dezonno et al. |
| 2003/0187726 A1 | 10/2003 | Bull et al. |
| 2003/0212745 A1 | 11/2003 | Caughey |
| 2004/0133793 A1 | 7/2004 | Ginter et al. |
| 2004/0153456 A1 | 8/2004 | Charnock et al. |
| 2004/0168190 A1 | 8/2004 | Saari et al. |
| 2004/0193602 A1 | 9/2004 | Liu et al. |
| 2004/0215711 A1 | 10/2004 | Martin et al. |
| 2005/0177387 A1 | 8/2005 | Mojsa |
| 2005/0183143 A1 | 8/2005 | Anderholm et al. |
| 2005/0265313 A1 | 12/2005 | Poikselka |
| 2006/0058948 A1 | 3/2006 | Blass et al. |
| 2006/0090184 A1 | 4/2006 | Zito et al. |
| 2007/0067297 A1 | 3/2007 | Kublickis |
| 2008/0077558 A1 | 3/2008 | Lawrence et al. |

FOREIGN PATENT DOCUMENTS

| | | |
|---|---|---|
| WO | WO-9834189 | 8/1998 |

OTHER PUBLICATIONS

Mark Lillibridge, Translucent Sums: A Foundation for Higher-Order Mosule Systems, Dec. 12, 1996.

Mark Lillibridge, Exceptions Are Strictly More Powerful Than Call/CC, Jul. 1995.

Mark Lillibridge, Unchecked Exceptions can be Strictly More Powerful than Call/CC, Nov. 25, 1995.

Robert Harper and Mark Lillibridge, Operational Interpretation of an Extension of Fw with Control Operators, Jan. 1993.

Robert Harper and Mark Lillibridge, Polymorphic Type Assignment and CPS Conversion, 1993.

Mark Lillibridge, et al., A Cooperative Internet Backup Scheme, Jun. 2003.

Cormac Flanaganet al., Extended Static Checking for Java, Jun. 2002.

Philippe Golle, et al., Incentives for Sharing in Peer-to-Peer Networks, Nov. 2001.

Robert Harper, et al., A Type-Theoretic Approach to Higher-Order Modules with Sharing, Jan. 1994.

Robert Harper, et al., Explicit Polymorphism and CPS conversion, Jan. 1993.

Robert Harper, et al., Polymorphic Type Assignment and CPS Conversion, Jun. 1992.

Bernardo A. Huberman and Rajan M. Lukose, Social Dilemmas and Internet Congestion, Jul. 25, 1997.

Bernardo A. Huberman et al., Strong Regularities in World Wide Web Surfing, Apr. 1998.

Rajan M. Lukose, et al., Surfing as a Real Option, 1998.

Lada A. Adamic, Search in power-law networks, Sep. 28, 2001.

Dejan S. Milojicic, et al., Peer-to-Peer Computing, Mar. 8, 2002.

Eytan Adar, et al., Shock: Aggregating Information While Preserving Privacy, 2003.

Lada A. Adamic et al., Local Search in Unstructured Networks, Jun. 3, 2002.

Rajan M. Lukose, Shock: Communicating with Computational Messages and Automatic Private Profiles, 2003.

A Methodology for Managing Risk in Electronic Transactions over the Internet, 2000.

Marcos K. Aguilera, et al., Block-Level Security for Network-Attached Disks, Mar. 2003.

Rafail Ostrovsky, et al., Efficient Consistency Proofs for Generalized Queries on a Committed Database, Jul. 20, 2004.

Silvio Micali, et al., Zero-Knowledge Sets, 2003.

Ralph C. Merkle, Protocols for Public Key Cryptosystems, 1980.

Chip Martel, et al., A General Model for Authenticated Data Structures, Dec. 6, 2001.

Borders, Kevin et al., "Web Tap: Detecting Covert Web Traffic", *University of Michigan, Department of Electrical Engineering and Computer Science*, (Oct. 25-29, 2004), 1-11.

"Oxford English Dictionary Online Definitition of "Spyware", OED.com, (Aug. 2004), 7-8.

Stern, Richard H., "FTC cracks down on spyware and PC hijacking, but not true lies", *IEEE Computer Society*, (Feb. 2005), 1-4.

Gallagher, et al., "A Framework for Targeting Banner Advertising on the Internet", *IEEE 13th Annual Hawwaii International Conference*, 1997.

Gain Corporation, "GAIN-Home", http://www.gatoradvertisinginformationnetwork.com, 1-2.

Webcash Generator, "A Get Paid to Surf and Free Money Programs", http://www.webcashgenerator.com, (Aug. 11, 2002),1-2.

Kraut, et al., "Markets for Attention: Will Postage for Email Help?" *CSCW'02-ACM*, (Nov. 16, 2002), 1-10.

Olsen, Stefanie "In Search of Profits-Tech News" CNET News.Com http://news.com/2030-1032-1000366.html, (May 8, 2003), 1-4.

Damgard, et al., "The Theory and Implementation of an Electronic Voting System", (Jul. 31, 2002),1-26.

The Captcha Project, "Can Hard AI Problems Foil Internet Interlopers", S. Robinson, SIAM News: http://www.captcha.net/news/ai.html, (2001),1-4.

The Captcha Project, "Gimpy", http://www.captcha.net/captchas/gimpy, (2000), 1-1.

The Captcha Project, "Telling Humans and Computer Apart (Automatically)", http://www.captcha.net, (2000),1-3.

NPSNET, "Anonymity with electronic money systems; How private are "private" electronic payment systems?", http://www.npsnet.com/danf/emonev-anon.html, (Apr. 19, 1996), 1-4.

IBLAST Inc., "What is iBlast? Transforming the connection between content and the consumer", http://www.iblast.com/wat.php3, (2002),1-1.

IBLAST Inc., "How iBlast works? The technology is already in place", http://www.iblast.com/how.php3, (2002),1-1.

Dotcast, "Dotcast-About Dotcast. First-of-a-Kind Network", http://www.dotcast.com/htdocs/ssi/about/about.htm, (Aug. 11, 2003),1-2.

Borland, John "TV-based high-speed network draws $60 million", CNET News.Com http://news.com.com/2100/1033/248200.html?tag-nl, (Nov. 6, 2000), 1-2.

Olsen, et al., "Disney preps wireless video service" CNET News.Com http://news.com.com/2100/1031/995846.html, (1995), 1-3.

Cachin, et al., "Cryptography and Information Security Group: Private Information Retrieval" *CIS Private Information Retrieval Reserach* http://theory.Ics.mit.edu/cis/pir.html, (1999), 1-1.

Canetti, et al., "Selective Private Function Evaluation with Applications to Private Statistics", *In Proceedings of Twentieth ACM Symposium on Principles of Distributed Computing PODC*, (2001), 1-10.

Lipmaa, Helger "Electronic Voting", *Cryptology Pointers* http://www.tcs.hut.fi/helger/crypto/link/protocols/voting.html, (Jan. 1, 1970), 1-2.

Copyright Office, "The Digital Millennium Copyright Act of 1998", *U.S. Copyright Office Summary*, (Dec. 1998), 1-8.

Lukose, et al., "Shock: Communicating with Computational Messages and Automatic Private Profiles", WWW 2003/ACM, (May 20, 2003), 1-10.

Dissanaike, et al., "Utilizing XML-RPC or SOAP on an Embedded System", *Proceedings from the 24th International Conference on Distributed Computing Systems Workshops (ICDCSW)*, (Mar. 2004), 438-440.

MICROSOFT.COM, "MSDN: Commerce Server 2000, Targeting and Personalization", *MSDN Database*, (2007), 1-4.

\* cited by examiner

Proof 510

511: $c_1$ | $c_2$ , $r_1$, $c_3$ | $c_4$ , $r_3$, $c_7$ | $c_8$ , $r_8$, (Y)

Verification Checks 520

$C = \text{hash}(c_1, c_2)$ ?

$c_1 = \text{hash}(r_1, c_3, c_4)$ ?

$c_3 = \text{hash}(r_3, c_7, c_8)$ ?

$c_8 = \text{hash}(r_8, \text{"Y"})$ ?

FIG. 5

SYSTEM AND METHOD FOR COMMITTING TO A SET

CROSS REFERENCE TO RELATED APPLICATION

This application is a continuation-in-part of U.S. patent application Ser. No. 10/639,140, by Rajan M. Lukose and Joshua R. Tyler, entitled "Targeted Advertisement with Local Consumer Profile," filed on Aug. 12, 2003, now abandoned which is incorporated herein by reference.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the field of processor-based systems, such as computer systems, it may be desirable for information and/or electronic data to be transferred from one system to another system via a network or other electronic means. For example, networks may be arranged to allow information, such as files or programs, to be shared across an office, a building, or any geographic boundary. The Internet, for example, is a global network that may allow for private e-mail communications, business transactions between multiple parties, targeted advertising, commerce, and the like. While networks such as the Internet may be used to increase productivity and convenience, they also may expose communications and computer systems to security risks (e.g., interception of confidential data by unauthorized parties, loss of data integrity, data manipulation, and unauthorized access to accounts).

Commitments may be used in interactive protocols between mutually distrusting parties. In some network communications, it may be desirable to have one party commit to a set of features such that the party can later prove that selected queries are satisfied by the committed-to set of features. Additionally, the committing entity may wish to prove that certain features were missing from the previously committed group. An improved method for providing such commitment is desirable.

BRIEF DESCRIPTION OF THE DRAWINGS

FIG. 5 is a block diagram illustrating a proof of membership in accordance with embodiments of the present invention;

DETAILED DESCRIPTION

Figure 1:
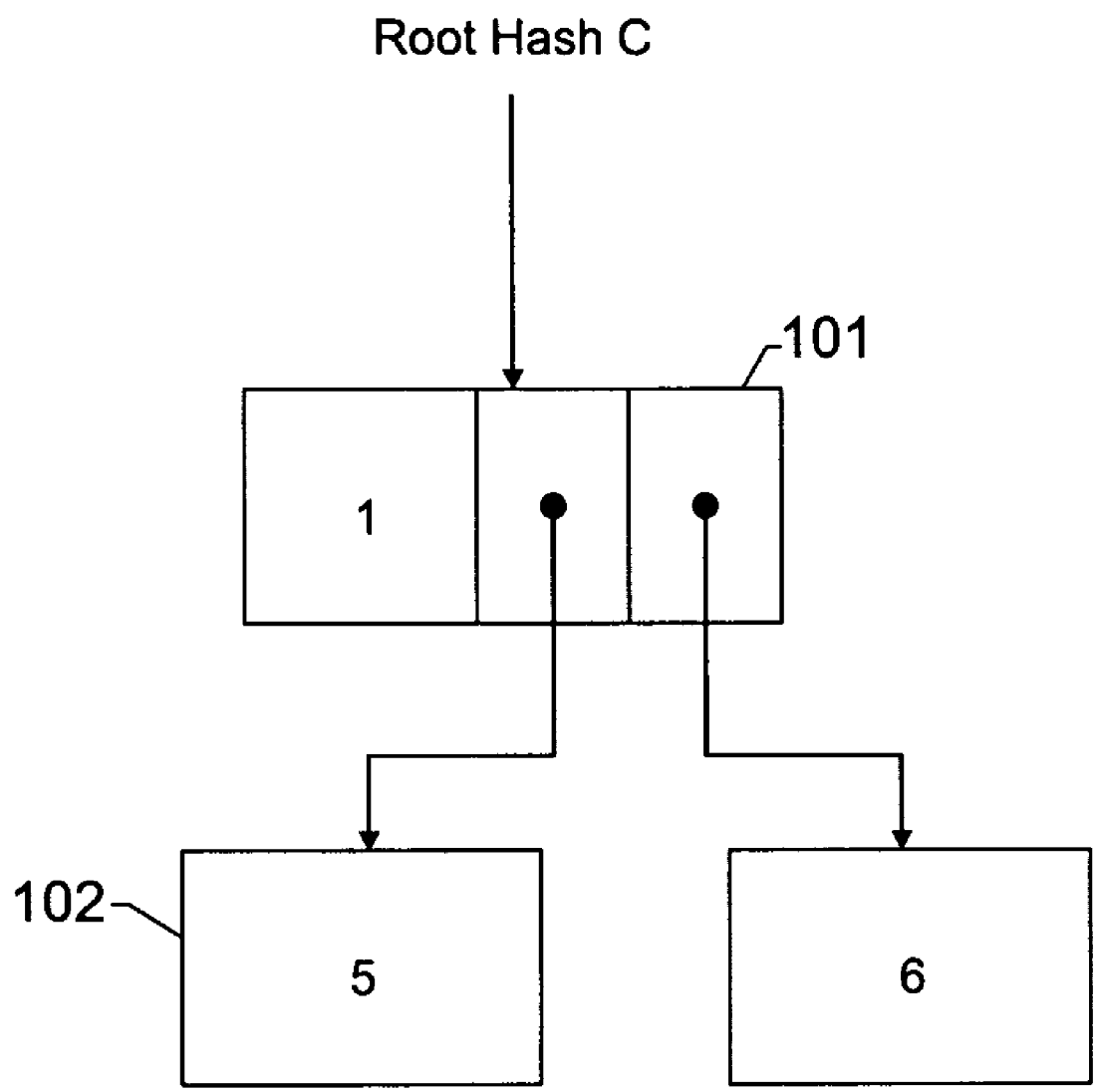
FIG. 1 is a block diagram that illustrates an HDAG in accordance with embodiments of the present invention.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. It should be noted that illustrated embodiments of the present invention throughout this text may represent a general case. For example, features illustrated as integer features may be turned into a series of binary features (e.g., "X=5" becomes "X's first bit is on" and "X's third bit is on").

Commitment methods may be used to commit to some data privately and (optionally) later prove what data was previously committed to. Such methods may include three parts: (1) a procedure for mapping the data to a small value, which may be referred to as a commitment token, and possibly some secrets (pieces of data held privately by the committer); (2) a procedure which takes the data D and a commitment token C produced earlier by (1) along with any associated secrets and produces a proof of the form "The data used to produce C is D"; and, (3) a procedure for verifying statements of the form produced by (2). These procedures may be arranged so that possessing C alone effectively reveals nothing about D.

An exemplary use of commitment methods may be illustrated by two parties attempting to flip a fair imaginary coin over a telephone as part of a game. This may be done as follows: each party flips a real coin, commits to the result, and sends the resulting commitment token to the other party. After exchanging the commitment tokens, each party may send a proof revealing what the value they committed to was. If both proofs verify, then the result of the imaginary coin is the exclusive-or (xor) of the two committed values. If one party's proof fails or if they refuse to follow this procedure, they are considered to be cheating. Note that if it was possible to learn about the other party's coin flip from just their commitment token or if it was possible to lie at revealment time about one's previously committed-to coin value, a party would be able to influence unfairly the result of the imaginary coin flip.

Set commitment methods are a specialization of commitment methods that may be used to commit to a set of values (e.g., a set of numbers, a set of names, or a set of web sites visited) privately and to later (optionally) prove information about the committed-to set's contents. In particular, they may allow proving that particular values are in the committed-to set. They may also allow proving that particular values are not in the committed-to set. Ideally, these proofs do not reveal anything else about the set's contents. An exemplary set commitment method is discussed in S. Micali, M. O. Rabin and J. Kilian, Zero-Knowledge Sets, The Proceedings of the 44th Annual IEEE Symposium on Foundations of Computer Science (2003). An example relating to set commitment can be found in the patent application by Mark David Lillibridge and Rajan Mathew Lukose U.S. patent application Ser. No. 10/909,161, filed Jul. 30, 2004, entitled "System and Method for Targeted Advertising Via Commitment", which is presently incorporated by reference herein.

A technique for building set commitment methods is the use of HDAG's (hash-based directed acyclic graph). An HDAG may be defined as a DAG (directed acyclic graph) wherein pointers hold cryptographic hashes (defined below) instead of addresses. A DAG may be defined as a data structure having directed edges and no path that returns to the same node. The node an edge emerges from is called the parent of the node that edge points to, which in turn is called the child of the original node. Each node in a DAG may either be a leaf or an internal node. An internal node has one or more child nodes whereas a leaf node has none. The children of a node, their children, and so forth are the descendents of that node and all children of the same parent node are siblings. If every child node has no more than one parent node in a DAG and every node in the DAG is reachable from a single node (called the root node), then that DAG is a tree. HDAG's that are trees are sometimes referred to as Merkle Trees. A binary tree may be a tree wherein every node in the tree has at most two children.

A cryptographic hash (shortened to hash in this document) may be defined as a small number produced from arbitrarily-sized data by a mathematical procedure called a hash function (e.g., MD5) such that (1) any change to the input data (even one as small as flipping a single bit) with extremely high probability changes the hash and (2) given a hash, it is infeasible to find any data that maps to that hash that is not already known to map to that hash. Because it is essentially impossible to find two pieces of data that have the same hash, a hash can be used as a reference to the piece of data that produced it; such references may be called intrinsic references because they depend on the content being referred to, not where the content is located. Traditional addresses, by contrast, are called extrinsic references because they depend on where the content is located.

FIG. 1 is a block diagram that illustrates an HDAG in accordance with embodiments of the present invention. Because HDAG's use intrinsic references instead of extrinsic references, they have special properties. In particular, any change to the contents of an HDAG with extremely high probability changes all references to it or any subpart of it whose contents have changed. This makes HDAG's very useful for building set commitment methods. For example, the following may represent an unrealistic set commitment method: To commit to a set S, the commiter builds an HDAG whose nodes contain the elements of S; the resulting commitment token is the hash of the root node. One possible such HDAG encoding {1, 5, 6} is shown in FIG. 1. Contrary to physical trees, computer trees are usually depicted with their root at the top of the structure and their leaves at the bottom. Because commitment token C depends on the entire HDAG, the commiter will be unable to change his mind once he announces C. It should be noted that C is the hash of the entire root node, including the two pointers to its children, and thus depends indirectly on its children's contents, and their children's contents, and so on.

To prove that a particular element, say five, is in the set whose commitment token the commiter announced, he merely need supply the contents of all of the nodes (inclusive) on the path from the root node to the node containing that element; in the case of five, this would be node 101 followed by node 102. The advantage of sending just a path to the node containing that element instead of the contents of the entire HDAG is that a path is often exponentially smaller than the entire HDAG. A skeptical observer may verify such proofs by checking that the first node hashes to C, each succeeding node's hash is contained in the preceding node as a pointer value, and that the final node contains the element whose presence is being proved. This method of proof is quite general: the presence of an arbitrary subset of nodes in an HDAG can be proved by supplying them and all their ancestors' contents.

Embodiments of the present invention relate to a method parameterized by a length of features L and in some cases a factor K that relates to a number of features that may be proved absent from a given committed-to set of features. In one embodiment of the present invention, a committed-to set may be obtained beginning with a set of L-bit strings representing features that act as input. Such a set may be obtained from a set of arbitrarily-sized features by cryptographically hashing each feature and keeping the first L bits of each hash. The set may be committed-to by first constructing an HDAG that encodes the set of L-bit features and then publishing the root hash of the constructed HDAG to those who wish to confirm the commitment. The exact data structure used for the committed-to HDAG is a crucial factor in determining the resulting set commitment method's properties.

Figure 2:
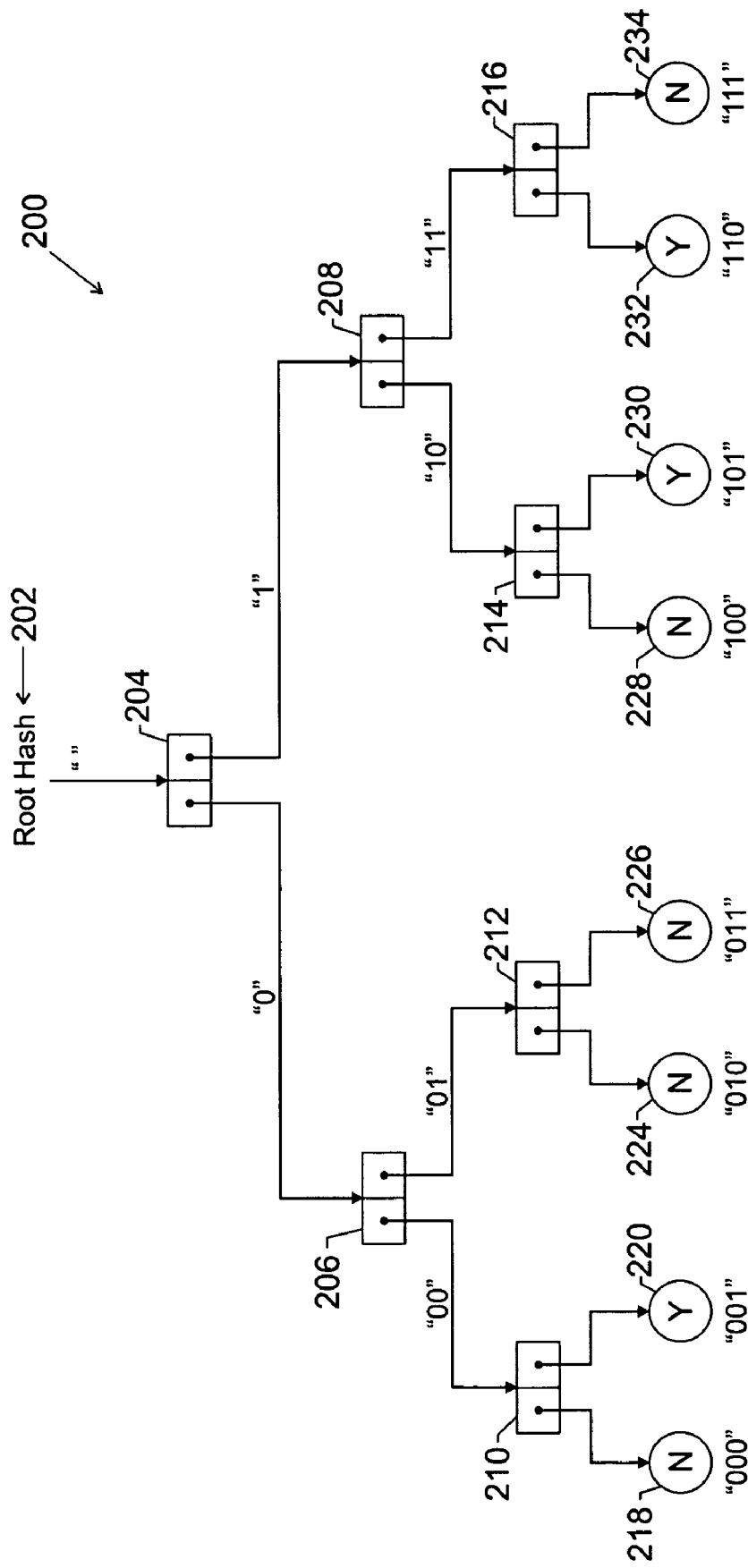
FIG. 2 is a block diagram illustrating an HDAG complete binary prefix tree 200 in accordance with embodiments of the present invention.

FIG. 2 is a block diagram illustrating an HDAG complete binary prefix tree 200 in accordance with embodiments of the present invention. Embodiments of the present invention may use a variant of a prefix tree of height L+1 (i.e., the maximum number of edges between a node and the root node in a tree plus one is equal to L+1) as an HDAG for commitments such as those described above. A prefix tree may be a tree where all of a given node's descendents' keys have the given node's key as a prefix. For example, in FIG. 2, the root node 204 has key " ", node 206 has key "0", node 212 has key "01", and so on. This makes searching for a node easy: start at the root and repeatedly choose the child whose key is a prefix of the key you are searching for. The keys may be stored explicitly in the nodes or implicitly, as in FIG. 2, assigned by a rule. For FIG. 2, the rule is that the root node has key " ", a left child gets the key of its parent followed by "0", and a right child gets the key of its parent followed by "1". For example, a prefix tree of height L may be a binary tree of height L+1, which maps L-bit binary strings to leaf nodes according to the rule of FIG. 2. It should be noted that branching factors other than two (binary) may be used.

Each of the possible L-bit features ($2^L$ in all) has a corresponding leaf node; that node contains "Y" if that feature is in the committed-to set and "N" otherwise. Prefix tree 200 corresponds to committed-to set S1={1, 5, 6} comprising three-bit number values (i.e., L is three). The tree 200, in accordance with embodiments of the present invention, comprises a root node 204, middle nodes 206, 208, 210, 212, 214, and 216, and leaf nodes 218, 220, 222, 224, 226, 228, 230, 232, and 234 having values as shown. The nodes of prefix tree 200 may be given implicit keys in accordance with the rule previously mentioned. Thus, a search of prefix tree 200 may be performed for the feature (key) five, which corresponds to bit string "101" (i.e., $5=101_2$) and whose presence information is stored in leaf node 230. Accordingly, at the root (node 204) a search would proceed to the right because the first bit value in bit string 101 is 1. At the next node (node 208), the search would proceed to the left because the next value in the bit string 101 is 0. Then the search would proceed right again at node 214 because the last bit is a 1 in bit string 101. The search would reach leaf node 230 wherein information about the presence of 5 in the set is stored. The presence of 5 in the set is indicated by the bit value illustrated by "Y" stored in leaf node 230. If five was not present in set S1, the leaf node 230 would contain a bit value represented by "N."

Alternate embodiments may place additional information in the leaf nodes corresponding to present features (e.g., the "Y" nodes of FIG. 2). For example, the complete name of the feature (i.e., the string hashed to produce the L-bit string used to reach that leaf node) might be included in the leaf node corresponding to that feature in order to increase the accuracy of membership proofs. Because a proof of membership of feature f includes the contents of the leaf node corresponding to feature f, it proves under this alternate embodiment that f and not just a feature whose hash has same first L-bits as f's hash belongs to the committed-to set. This mechanism of sticking information in leaf nodes is completely general, and can be used associate arbitrary types of information with every feature in the committed-to set. If a value is associated in this way with every feature, then the embodiments of this invention may be used to commit to an arbitrary mapping from feature names to values.

The only actual information about what the set S1 contains resides in the leaf nodes: the superstructure or internal nodes of the tree may be exactly the same (module exact pointer values) no matter what features are actually present in the set. Moreover, the path (including whether to branch right or left) from the root node to the node containing the information about whether or not a given feature is present in the set depends only on that feature's name. Thus, supplying that path may constitute proof that that feature is/is not in the committed set. (If the relevant information about that feature's presence could be in multiple places, then multiple paths might have to be supplied.) These proofs may leak information because it is sometimes possible to figure out what a hash pointer references. In particular, if an adversary can guess to what a hash pointer points, he can easily check his guess by hashing his guess and seeing if its hash is the same as the value of the hash pointer. Guessing may become relatively easier near the bottom of the tree because there are so few possibilities for small subtrees.

While this data structure works well for small L, it may use too much storage for larger L because there is a node for every single possible string: Required storage space increases exponentially with the length L. Using cryptographic hashing to reduce the size of features may reduce L somewhat.

Figure 3:
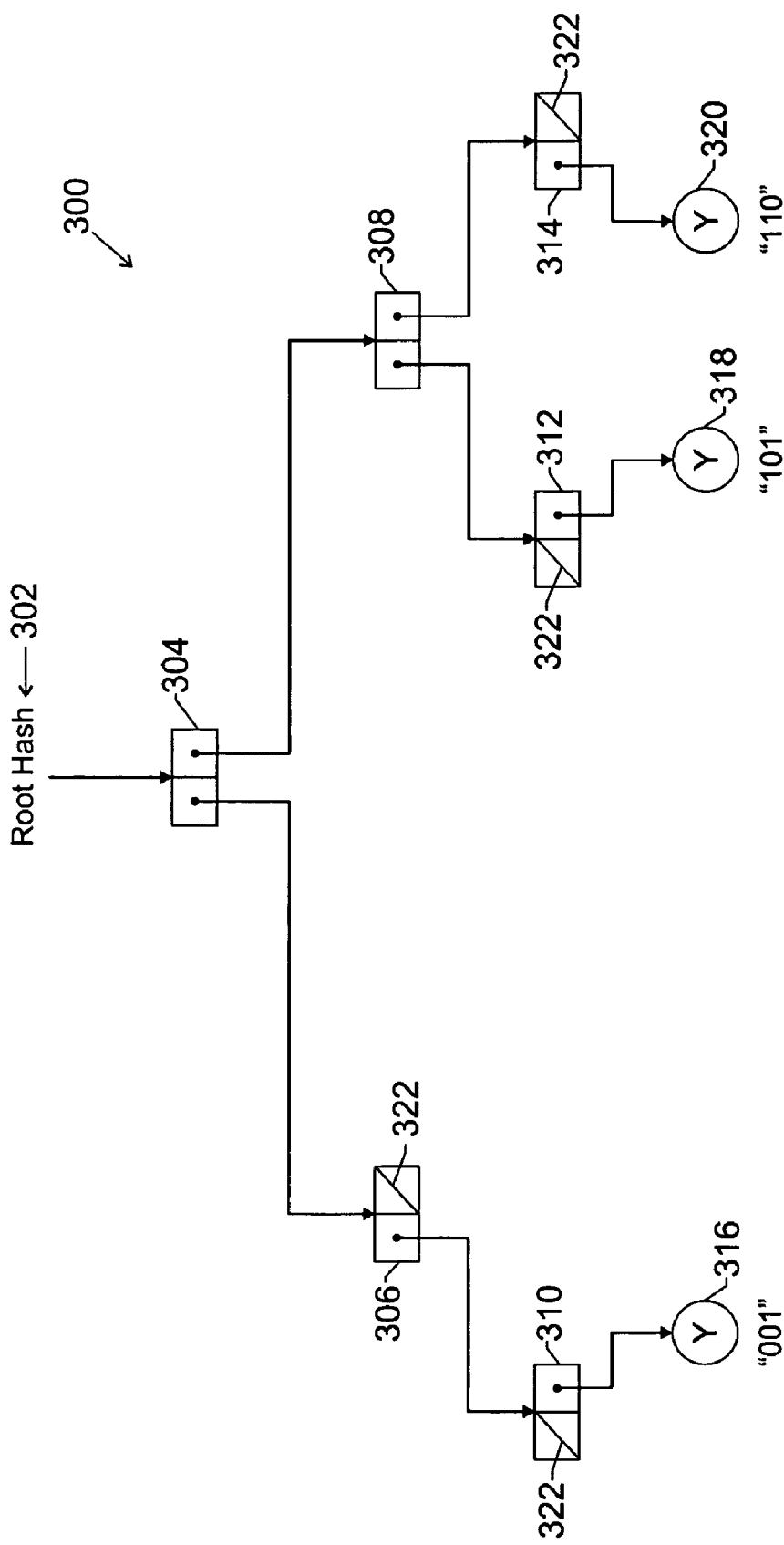
FIG. 3 is a block diagram illustrating an HDAG prefix tree in accordance with embodiments of the present invention.

FIG. 3 is a block diagram illustrating an HDAG prefix tree 300 in accordance with embodiments of the present invention. Specifically, HDAG prefix tree 300 may be an optimized version of the HDAG prefix tree 200 illustrated in FIG. 2. In prefix tree 200, for example, if each leaf node represents a URL and each URL contains one-hundred 8-bit characters, there are $2^{800}$ possible URLs and it is infeasible to have one node for each possible URL. Prefix tree 300 may solve this space cost issue by optimizing space via compression. Specifically, in prefix tree 300 any sub-tree having only leaves with "N"s is left out and a null pointer (i.e., a pointer that points to nothing) may be used in its place.

Prefix tree 300 comprises a root node 304, middle nodes 306, 308, 310, 312, and 314, and leaf nodes 316, 318, and 320. Null pointers 322 are indicated by a slash. In accordance with embodiments of the present invention, the null pointers 322 may be holding a special hash value null (e.g., 0) that corresponds to no known data. Proofs are the same here as for the previous embodiment except that proofs that features are missing may end early in a null pointer instead of a leaf node containing an "N". This may create a new information leak: as soon as a party recognizes a null pointer 322 (required for the proof to work), that party may know the associated sub-tree is empty (e.g., it has no "Y" leaves) and thus that the associated features are missing. This may not happen for proofs of presence.

To prevent information from leaking due to guessing what hash pointers reference, randomness may be added to the data structure to which a commitment is being made. This may be done in many different ways. For example, a different random number may be placed in each leaf node in FIG. 2. Given sufficiently long random numbers, it would be totally infeasible for an adversary to try even a small fraction of the possibilities. Randomness may need to be added in enough places so that every hash pointer that needs to be unguessable refers to something containing a random number. This change may make the proofs (both of presence and of absence) for the embodiment depicted in FIG. 2 leak no information whatsoever. It should be noted that adding randomness does not permit the commiter to lie because the hash pointers still depend on the features' present/absent information. This randomness should be refreshed (each random number replaced by a new random number) before each commitment if an HDAG using randomness to prevent leaking is to be reused.

Simply adding randomness to nodes in the embodiment depicted in FIG. 3 does not prevent its proofs from leaking information: because null pointers do not refer to any nodes and hence any random values, they are still easy to guess. Worse, null pointers generally must be recognizable to proof checkers so they can distinguish between the feature present and feature absent cases. Proofs of presence (but not absence) may be made to leak no information by making null pointers unrecognizable without the commiter's cooperation. This may work because null pointers are never followed in presence proofs. Pointers using intrinsic references that reveal no information without that pointer's creator's cooperation may be referred to as blinded pointers.

Blinded pointers may be created by storing (ordinary, non-set) commitments to hashes instead of just hashes in pointers. When a blinded pointer needs to be followed in a proof, a sub-proof revealing its underlying hash may be included. Any ordinary commitment method may be used. For concreteness, in our examples we use the following simple method: to commit to a value v, a random secret r is chosen yielding commitment token hash(v, r) where hash(-) is some cryptographic hash function; the proof that the committed value was v is (v, r); and the verification procedure is to check that the proof hashes to the commitment token.

Figure 4:
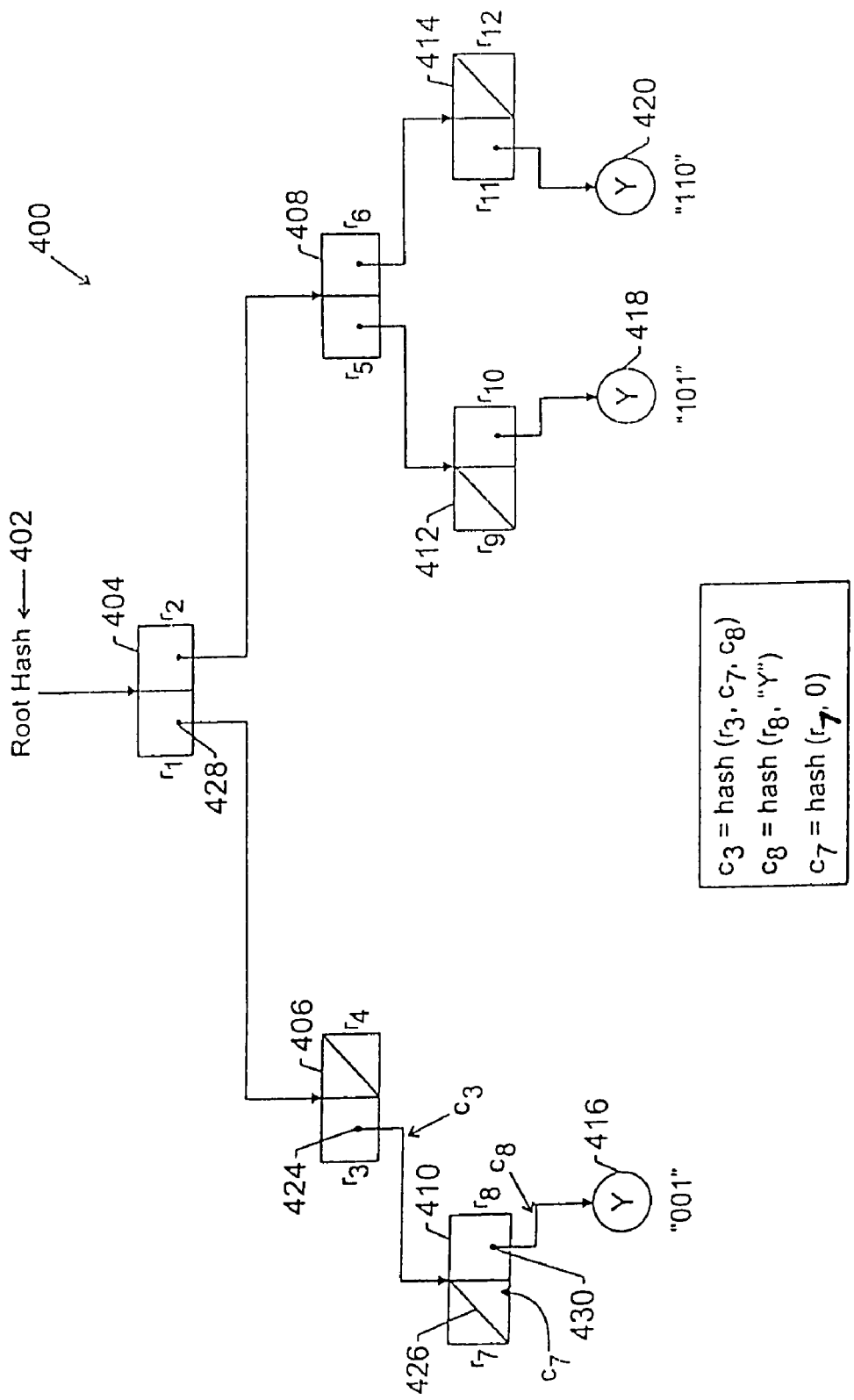
FIG. 4 is a block diagram illustrating a blinded HDAG prefix tree in accordance with embodiments of the present invention.

FIG. 4 is a block diagram illustrating a blinded HDAG prefix tree 400 in accordance with embodiments of the present invention. Specifically, FIG. 4 may be a blinded version of FIG. 3 (all pointers have been blinded) comprising search nodes 404, 406, 408, 410, 412, and 414, and leaf nodes 416, 418, and 420 as shown. Additionally, FIG. 4 may demonstrate how to compute blinded pointer values in accordance with embodiments of the present invention. The c values (e.g., $c_3$, $c_7$, $c_8$), represent ordinary commitment tokens. For example, $c_3$ represents the value of the pointer 424, which refers to node 410. The secret random number associated with the commitment token $c_i$, labeled $r_i$, is shown in FIG. 3 next to the head of the pointer whose value is $c_i$. For example, in FIG. 3, $r_3$ is located just to the left of the head of the pointer 424, whose value is $c_3$. These secrets are not part of any HDAG node. Accordingly, the following equation shows how to calculate $c_3$:

$$c_3 = \text{hash}(r_3, c_7, c_8) \quad \text{Equation 1}$$

Similarly, the following two equations represent calculation of $c_7$ (the value of null pointer 426) and $c_8$:

$$c_7 = \text{hash}(r_7, 0) \quad \text{Equation 2}$$

$$c_8 = \text{hash}(r_8, \text{``}Y\text{''}) \quad \text{Equation 3}$$

The hash $c_7$ is calculated using the assumption that zero is the underlying value of a null pointer.

Using blinded pointers as described above in accordance with embodiments of the present invention may prevent information from leaking. For example, a second party may attempt to determine whether $c_7$ is a null pointer without authorization from a first party. However, the second party may not be able to recognize $c_7$ as a null pointer because the party may not have the value of $r_7$ and thus the commitment may prevent an information leak. If a first party chooses to provide a proof of certain values in an HDAG, the first party may provide a node trace along with the secrets (e.g., $r_3$, $r_8$) associated with the pointers followed in the trace. For example, if a first party provides proof to a second party that leaf node 416 has a value of "Y", the second party will receive $c_7$ as part of the associated node trace because $c_7$ is part of search node 410. However, in accordance with embodiments of the present invention $c_7$ may appear random to the second party because the second party does not have $r_7$, which may be required to interpret $c_7$. The second party may only be given the secrets necessary to confirm the value of leaf node 416. Accordingly, the use of random values can essentially hide all of the pointers (e.g., pointer 426) destinations, except those of pointers followed by a particular node trace.

It should be noted that in a prefix tree, the use of null pointers as illustrated by FIG. 4 may preclude a negative proof (a proof that a feature is not present) without any loss of privacy. For example, a first party may indicate to a second party that a value is not present by providing a trace to a null pointer (e.g., null pointer 426) including revealing that it is a null pointer. While the null pointer may prove that the desired value is not present, it may also be proof to an observer that everything else in the missing sub-tree is not present: A null pointer cannot be present if there is a "Y" in a leaf node below.

FIG. 5 is a block diagram illustrating a proof of membership in accordance with embodiments of the present invention. Specifically, FIG. 5 represents an exemplary proof of membership of "001" in accordance with FIG. 4. The proof (block 510) may represent a node trace beginning with root node 404 as shown in FIG. 4. In accordance with block 510 and FIG. 4 the trace proceeds through pointer 428 to node 406, through pointer 424 to node 410, and through pointer 430 to the leaf node 416 having the value "Y". The secrets associated with pointers 424, 428, and 430 (i.e., $r_1$, $r_3$, and $r_8$) may be provided to the second party or verifier but, to maintain privacy, no other secrets are provided. In particular, $r_2$, $r_4$, and $r_7$ may not be provided to the second party or verifier in the illustrated example (block 510). Accordingly, because the random numbers associated with $c_2$, $c_4$, and $c_7$ are not available to the verifier, $c_2$, $c_4$, and $c_7$ may appear random to the verifier. The actual hashes committed to do not need to be provided separately because they can be calculated by hashing the included nodes. This proof 510 is sufficient to convince a second party or verifier that "001" is present in the committed-to set in accordance with the embodiments of the present invention. Block 520 represents verification or confirmation steps that may be performed by the second party or verifier. Specifically, block 520 represents checking that the set commitment token is the hash of $c_1$ and $c_2$, checking that the value of the left pointer of node 511 ($c_1$) is the hash of $r_1$, $c_3$, and $c_4$, and so forth as illustrated in the figure. Eventually, the verifier will confirm that "Y" is associated with the path for "001".

Figure 6:
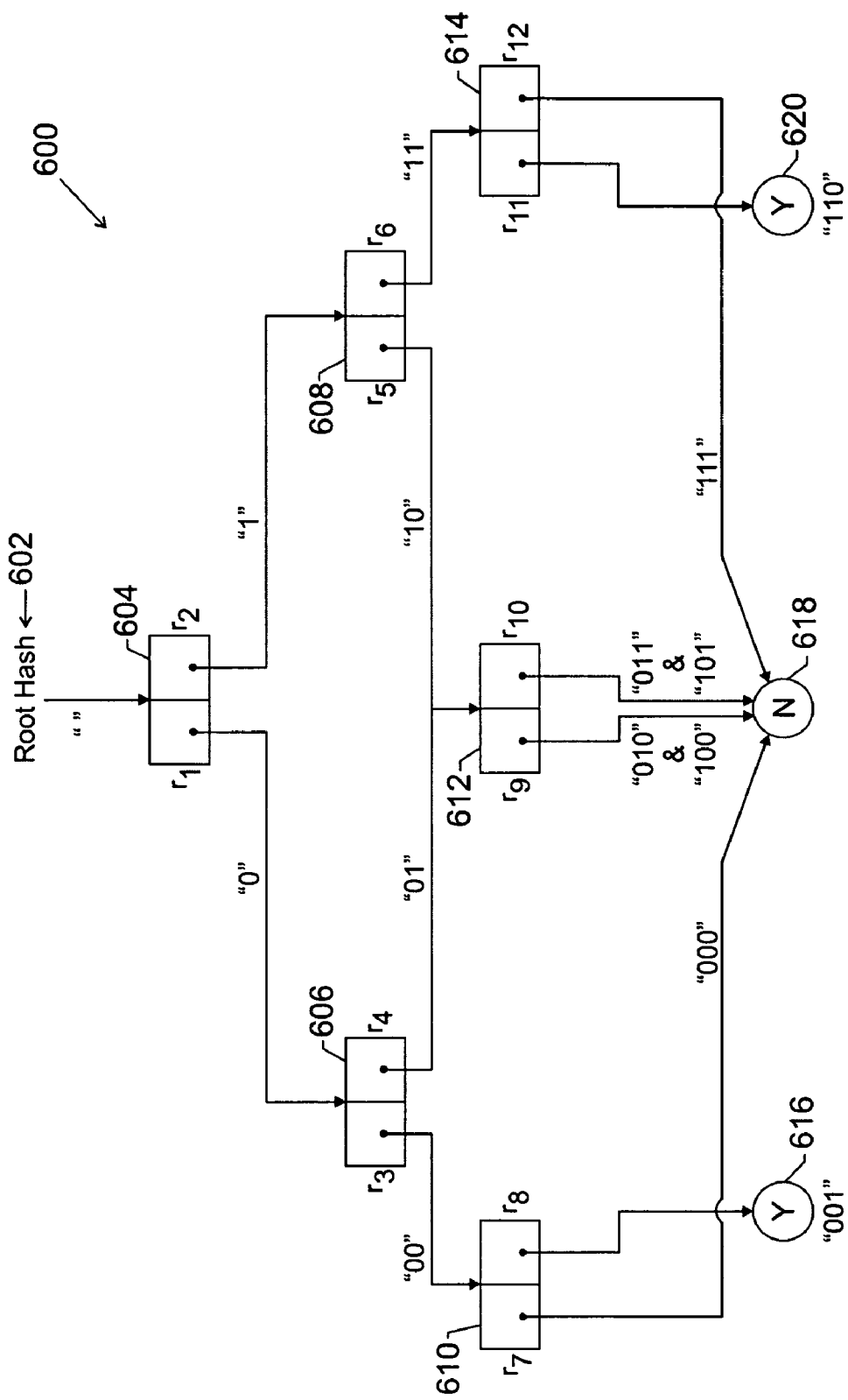
FIG. 6 is a block diagram illustrating a blinded HDAG prefix DAG in accordance with embodiments of the present invention.

FIG. 6 is a block diagram illustrating a blinded HDAG prefix DAG 600 in accordance with embodiments of the present invention. A prefix DAG is a DAG that when expanded out to form a tree by duplicating nodes with multiple parents forms a prefix tree. In a prefix DAG, nodes may have multiple implicit keys, one for each different way they can be reached from the root. For example, node 612 has implicit keys "01" and "10". The prefix DAG 600 comprises search nodes 604, 606, 608, 610, 612, and 614, and leaf nodes 616, 618, and 620 as shown. Specifically, prefix DAG 600 may be an optimized or compressed prefix tree that reuses nodes that do not contain "Y" and have no "Y" descendents to save storage space. For example, as illustrated in FIG. 6, each pointer that relates to an "N" leaf may be directed to the same leaf node 618, which stores an "N" value. Similarly, multiple search nodes having the same number of "N" descendents, but no "Y" descendents, may be combined into a single search node (e.g., node 612). FIG. 6 demonstrates that only one negative leaf node (e.g., node having an "N" value) is required regardless of how many features (e.g., "Y" values) are in the committed-to set of features. The embodiment illustrated by HDAG 600 uses only a little more storage space than the one illustrated by HDAG 400 of FIG. 4 (no more than L+1 extra nodes to be precise). Unlike with HDAG 400, it is possible with HDAG 600 to issue one non-membership proof (i.e., proof of absence) per commitment token without leaking any information. (Both embodiments allow any number of membership proofs per commitment token without leaking information.)

If two non-membership proofs are issued involving the same commitment token, information may leak because the node traces of the two proofs may reveal that some node is reachable from the root in different ways. (A node is recognizable wherever it occurs because of its unique ordinary commitment tokens.) If an adversary discovers that a node can be reached in two different ways, he can be sure that no descendent of that node is a "Y" leaf. Discovering that a node is reachable in two different ways is the only way that information can leak when using the embodiment illustrated by HDAG 600 because of its use of blinded pointers and lack of null pointers. Because proofs of membership never traverse nodes reachable in multiple ways (remember that only nodes that contain "N" or have only "N" leaves are combined), if the committer limits himself to issuing only at most 1 non-membership proof per commitment token then no node will be revealed to be reachable in multiple ways.

Figure 7:
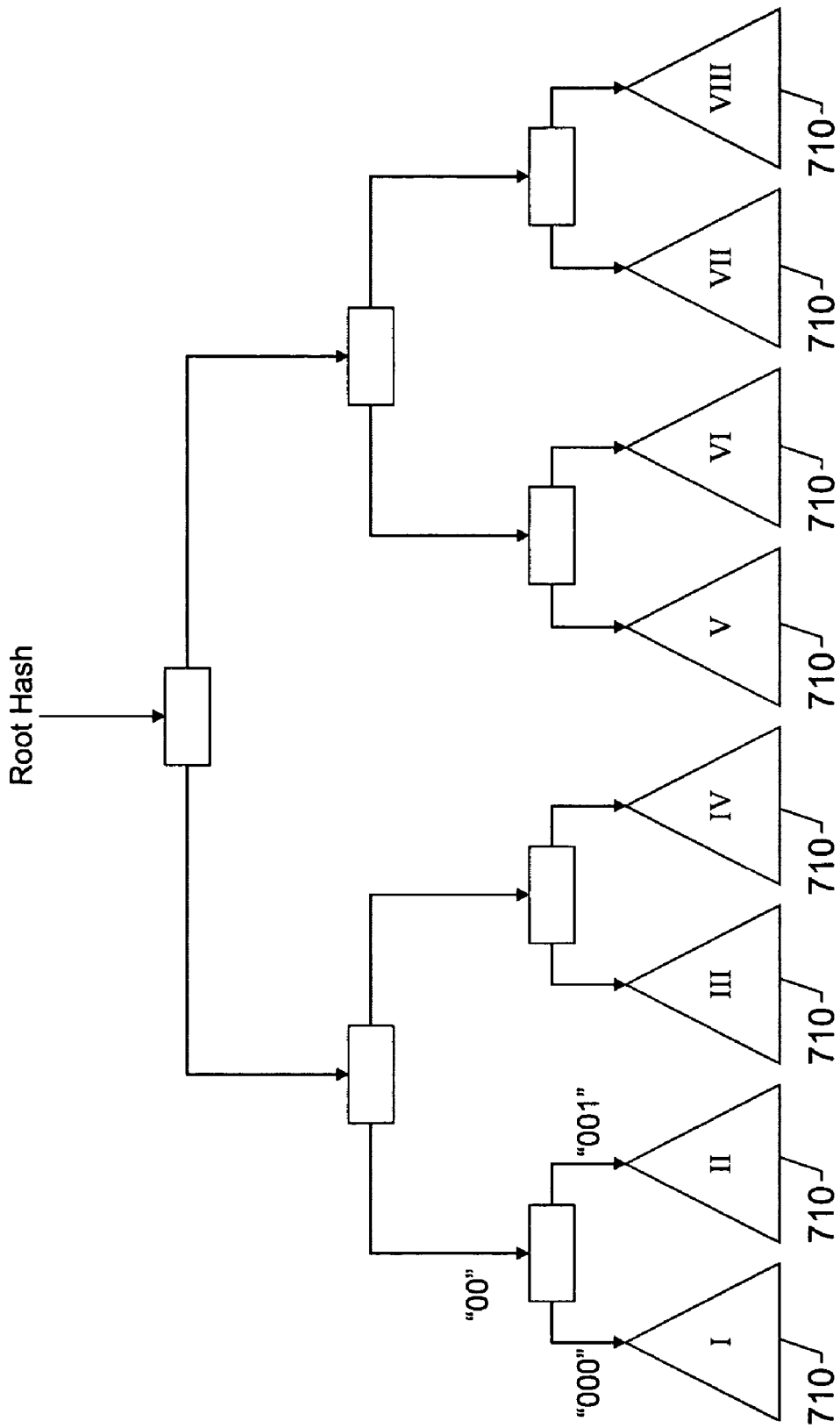
FIG. 7 illustrates a blinded HDAG prefix DAG divided into regions in accordance with embodiments of the present invention.

FIG. 7 illustrates a blinded HDAG prefix DAG divided into regions 710 in accordance with embodiments of the present invention. The details of nodes and regions have been omitted. Each region 710 may represent a sub-prefix DAG. For example, if each region 710 merely represented a single leaf node, the graph would be much like the prefix tree 200, which requires excessive amounts of storage, except with blinded pointers. Each region 710 or certain regions 710 may be individually compressed in the same manner as FIG. 6. Each node that has only "N" descendents or contains "N" may be referred to as a special node.

Figure 8:
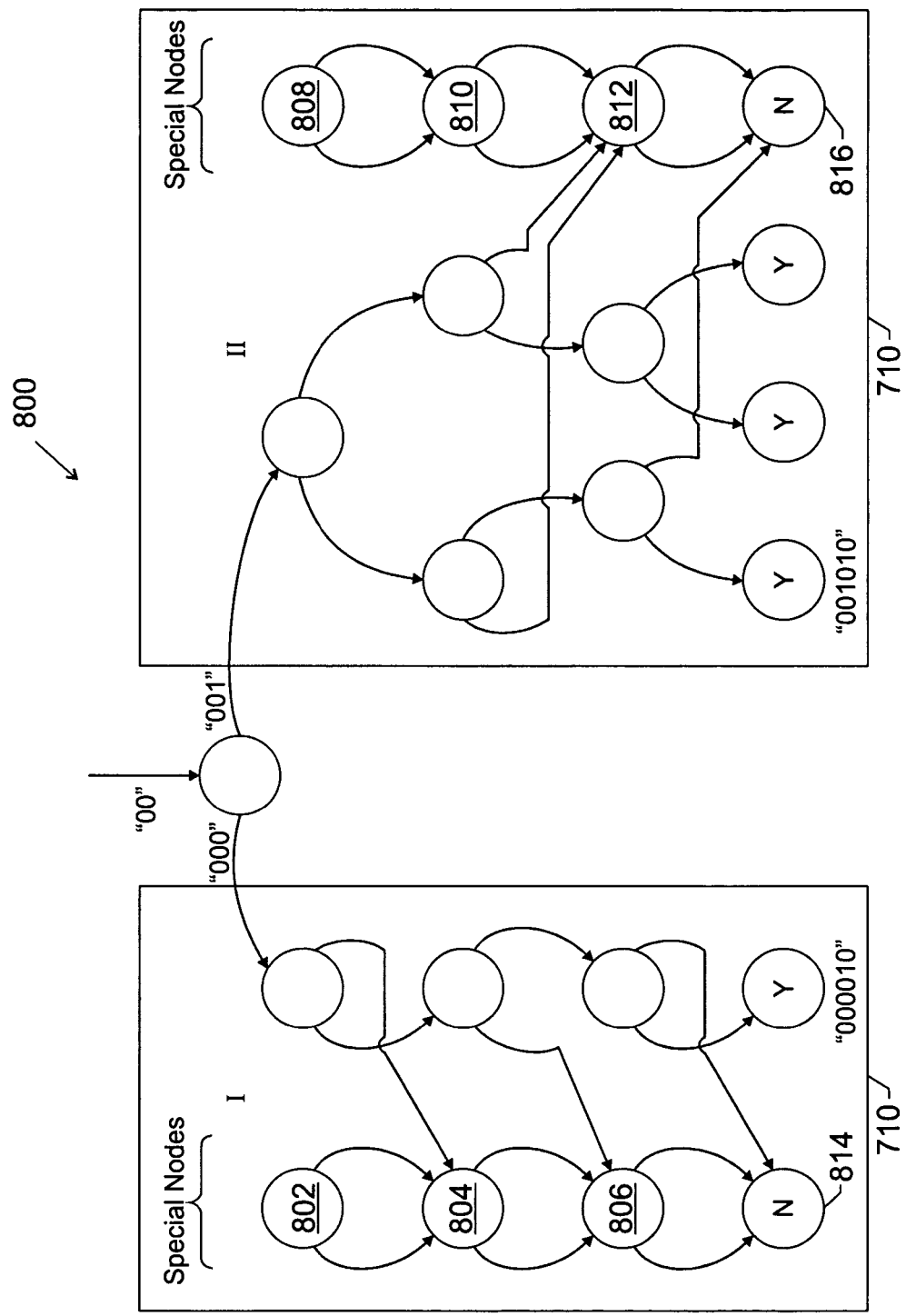
FIG. 8 is a block diagram of a portion of a prefix DAG in accordance with embodiments of the present invention.

FIG. 8 is a block diagram of a portion of a blinded HDAG prefix DAG 800 in accordance with embodiments of the present invention. Node details have been omitted. Specifically, the diagram may illustrate a detailed view of regions I and II from FIG. 7. Nodes 802, 804, 806, 814, 808, 810, 812, and 816 are special nodes. These nodes are essentially distinguished among themselves by the region they belong to and the number of times pointers must be followed to get to a leaf node containing "N."

Organizing a tree into regions such as the illustrated regions 710 may allow for more than one non-membership proof to be issued without leaking information. The regions allow division of the tree and reuse of nodes only within a region. If a tree is divided into regions based on the first K bits of each string, $2^K$ regions may be obtained with each region having L−K+1 special nodes that encode each of the possible sub-trees having no leaf node descendents with a "Y" value. Under a construction such as this, two non-membership proofs can have a reused node in common (and hence potentially reveal a node reachable in multiple ways) only if they are for two strings whose first K bits are the same. Thus, at the cost of $O(N*L+2^K*(L-K+1))$ time and space where N is the number of features in the set to be committed to, the committer can issue up to $2^K$ non-membership proofs without leaking information so long as each is for a string with a different K-bit prefix.

The restriction on which non-membership proofs can be issued may be made less onerous by randomly assigning features to each region. To do this, a random permutation may be applied to all of the features before being added to a set. The permutation should be published or agreed upon before commitment time. For example, to commit to the features $000000_2$ and $000001_2$, using the procedure described above, the committer publishes the set commitment token resulting from committing to the set $\{P(000000_2), P(000001_2)\}$ and P. To prove that $100000_2$ and $100001_2$ are not in the committed-to set, the committer may show proofs that $P(100000_2)$ and $P(100001_2)$ are not in the committed-to set. This may be done without risking privacy loss as long as $P(100000_2)$ and $P(100001_2)$ differ in their first K bits, which will happen with probability $1-2^{-k}$. Note that the probability that the committer can do this is independent of the other contents of the committed-to set. Therefore, whether or not the committer can provide a proof does not leak extra information. If a party who will be requiring proofs is allowed to choose the permutation and possibly K as well, they may be able to choose a permutation that definitely maps each of the nonmembership proofs they might want to different regions. This does provide a little advance information about what proofs might be desired, but almost certainly not enough to matter.

If the committer must be able to issue two or more proofs of nonmembership under any circumstances, however unlikely, he can commit to his set multiple times, producing a different HDAG 800 each time, agreeing that his actual committed-to set is the intersection of all the sets he committed to. That is, under this scheme, a valid membership proof of feature f consists of one membership proof for feature f for each of the committed-to sets, and a valid non-membership proof of feature f consists of a proof that feature f is not a member of one of the committed-to sets. Since the non-membership proof limits are per HDAG 800, this means he is guaranteed to be able to issue at least one non-membership proof per committed-to set. This scheme, however, uses more storage and time than a single HDAG 800 with many regions.

Figure 9:
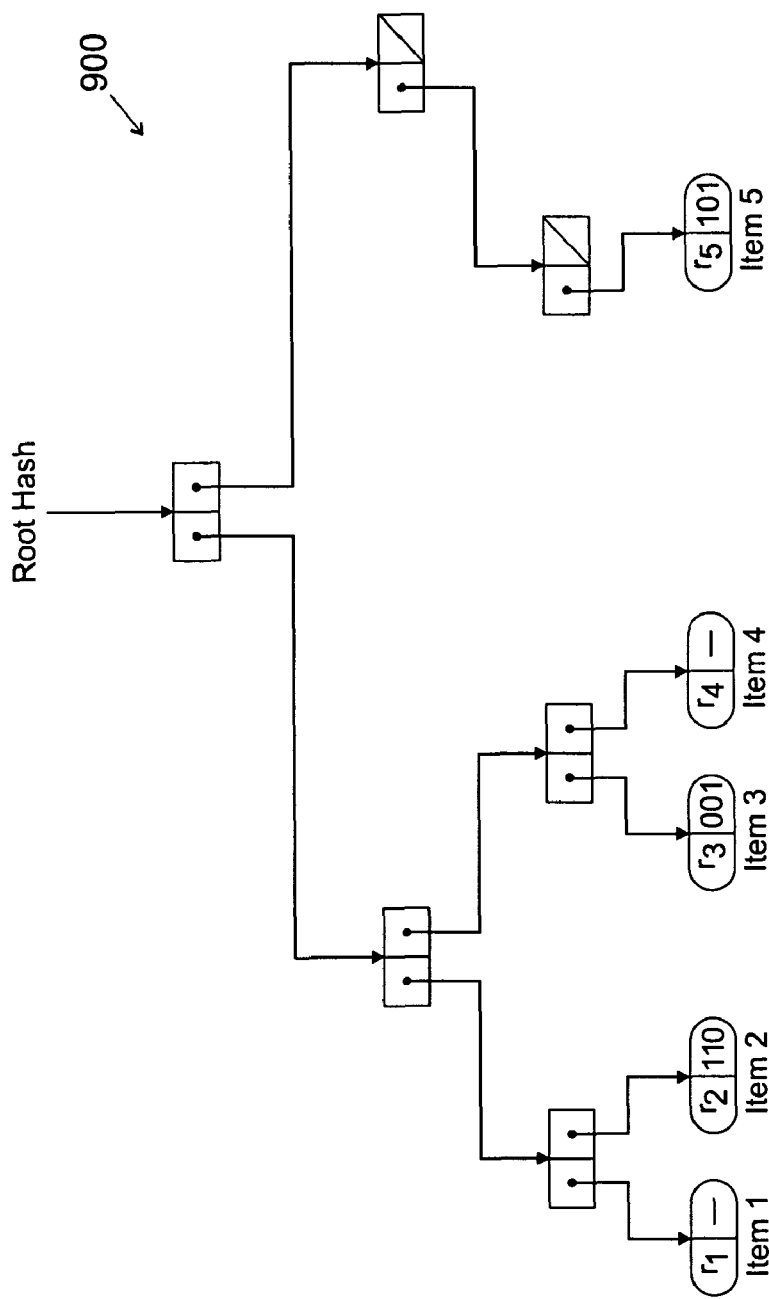
FIG. 9 is a block diagram illustrating an HDAG for use in limiting committed-to sets to no more than a designated size in accordance with embodiments of the present invention.

FIG. 9 is a block diagram illustrating an HDAG 900 for use in limiting committed-to sets to no more than a designated size (here 5) in accordance with embodiments of the present invention. For some applications of embodiments of the present invention, it may be desirable to provably limit the size of a set that can be committed to. For example, this may eliminate the potential for a committer simply throwing in a large assortment of features to maximize the chances of matching an unknown future query. Data structure 900 may be used to assign each committed-to feature a unique item number in the range 1 . . . <maximum number of allowed features>. Here, HDAG 900 is a simple binary prefix tree of height four, which is sufficient to encode the desired range. Note the use of randomness in the leaf nodes to prevent information leaks. To save space, subtrees containing only item numbers beyond the maximum are omitted. Any other HDAG data structure that accomplishes the same result (provably mapping a range of integers to exactly one value each) could be used instead. To prevent any leaking of the contents or size of the actual set (beyond the already known maximum), features should be mapped to valid item numbers randomly. If there are fewer features than the maximum allowed, any remaining valid item numbers will need to be mapped to placeholders. In the example of FIG. 9, HDAG 900 assigns item number 3 to feature $001_2$, item number five to feature $101_2$, and item number two to feature $110_2$; item numbers one and four are assigned to placeholders.

Data structure 900 (or any of the similar data structures that accomplish the same result) may be utilized in parallel with a data structure such as that represented by FIG. 7. Under this approach, at commitment time the committer builds and commits to an appropriate version of HDAG 900 as described above in addition to building and committing to an appropriate version of HDAG 700. Both commitment tokens are given out to interested parties. Membership proofs combine the usual proof of membership that the given feature is in the committed-to set represented by the committed-to HDAG 700 with a proof that the given feature is assigned a item number in the range 1 . . . <maximum number of allowed features> by the committed-to HDAG 900. Because HDAG 900 allows only one feature to be assigned to each item number, no more than the maximum number of features can be proved to be in the committed-to set. Non-membership proofs require only the usual proof of nonmembership in the committed-to set represented by the committed-to HDAG 700. So long as the nonmembership proof limits required by HDAG 700 are adhered to, this combined embodiment leaks no information. HDAG 900 may be combined in this way with any of the previous embodiments or with any other set commitment method.

HDAGs such as prefix tree 900 alone may be used alone to commit to a set if only membership proofs are needed and the size of the set must be provably limited. This type of HDAG has the advantage that is places no limits on the size of features. Additionally, multiple HDAGs such as HDAG 900 may be used to enforce different limits on the number of features belonging to different types. For example, one HDAG may be used to limit the number of URLs in a set to 10,000 and a different HDAG may be used to limit the number of keywords searched in the same set to 1,000. The proof of membership for a URL or keyword would be accompanied by the appropriate limit proof(s). It should be noted that while there are benefits to using the type of HDAG presented in FIG. 9, other embodiments of the present invention may use different methods.

Figure 10:
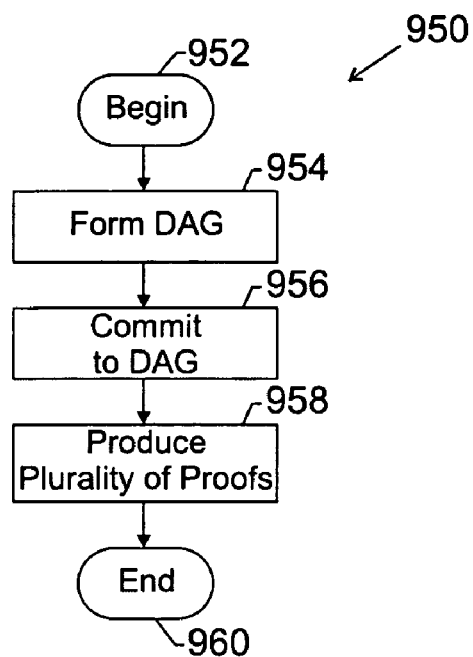
FIG. 10 is a block diagram illustrating a method of committing to a data set in accordance with embodiments of the present invention.

FIG. 10 is a block diagram illustrating a method 950 of committing to a data set in accordance with embodiments of the present invention. Block 952 represents beginning the method 950. Block 954 represents forming a directed acyclic graph adapted to encode the data set. In some embodiments, the directed acyclic graph comprises a plurality of pointers and a plurality of nodes wherein at least one node has multiple parents, the directed acyclic graph having at least one root node and a plurality of leaf nodes. Block 956 represents committing to the directed acyclic graph to produce a committed-to data set and block 958 represents producing a plurality of proofs about the committed-to data set. In some embodiments the plurality of proofs are such that a combination of the plurality of proofs does not reveal information about which nodes have multiple parents, each proof comprising a trace from one of the plurality of nodes to at least one different node, the trace comprising the identities of the nodes and pointers traversed. Block 960 represents ending the method.

Figure 11:
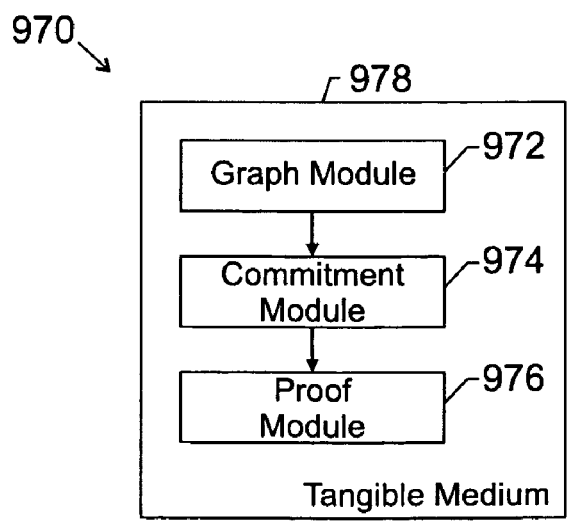
FIG. 11 illustrates a system for committing to a data set in accordance with embodiments of the present invention.

FIG. 11 illustrates a system 970 for committing to a data set in accordance with embodiments of the present invention. Specifically, the system 970 comprises a graph module 972 adapted to form a directed acyclic graph. In some embodiments, the directed acyclic graph may be adapted to encode the data set and may have a plurality of pointers and a plurality of nodes wherein at least one node has multiple parents. Additionally, the directed acyclic graph may have at least one root node and a plurality of leaf nodes. Block 974 represents a commitment module adapted to commit to the directed acyclic graph to produce a committed-to data set. Block 976 represents a proof module adapted to produce a plurality of proofs about the committed-to data set. In some embodiments, the plurality of proofs are such that a combination of the plurality of proofs does not reveal information about which nodes have multiple parents. Each proof may comprise a trace from one of the plurality of nodes to at least one different node, the trace comprising the identities of the nodes and pointers traversed. Further, the modules in FIG. 11 may be stored on tangible medium 978 (e.g., hard drive, CD, magnetic tape).

Figure 12:
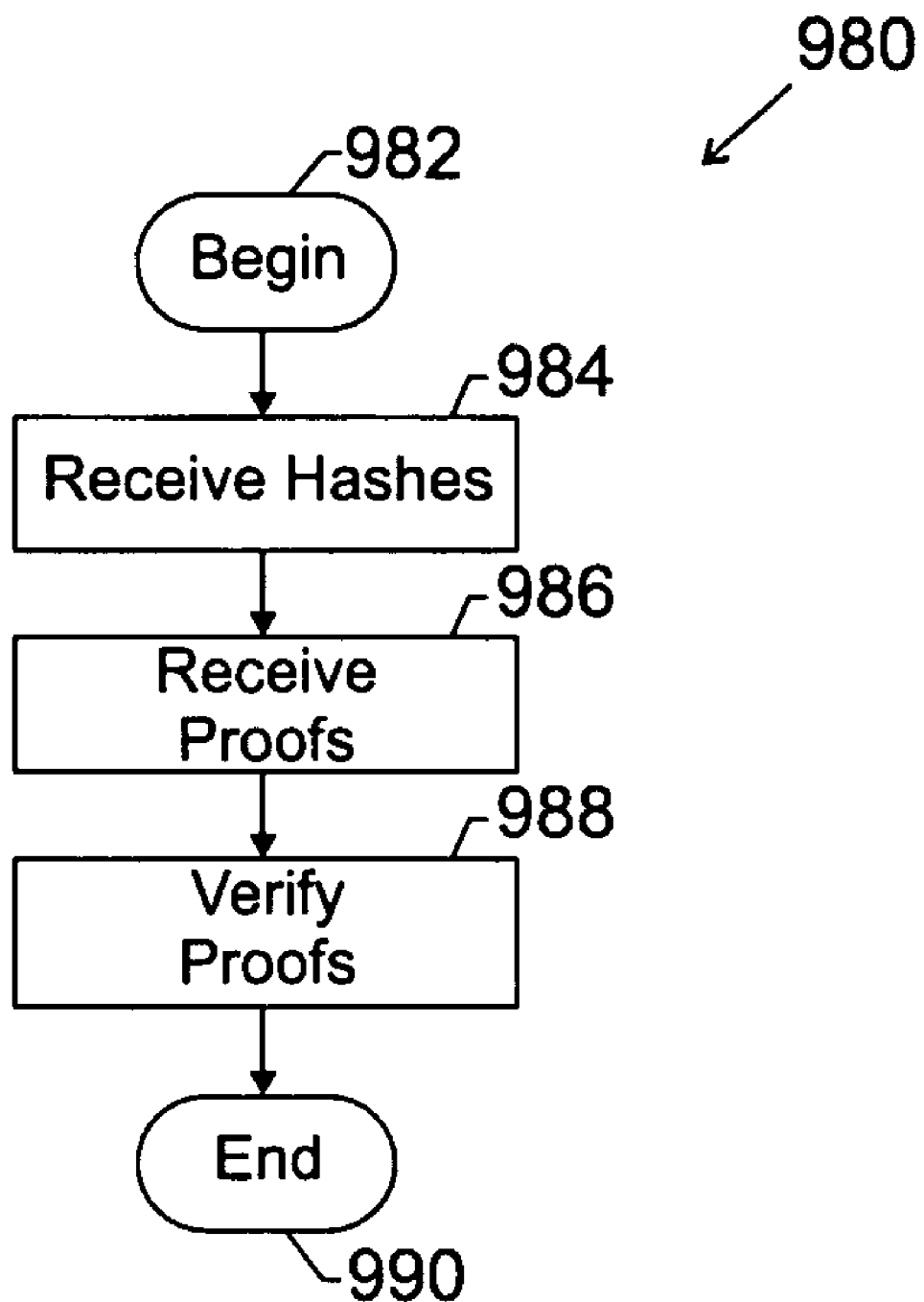
FIG. 12 is a block diagram illustrating a method of verifying a plurality of proofs about a committed-to data set in accordance with embodiments of the present invention.

FIG. 12 is a block diagram illustrating a method 980 of verifying a plurality of proofs about a committed-to data set in accordance with embodiments of the present invention. Block 982 represents beginning the method 980. Block 984 represents receiving hashes of at least one root node from a hash-based directed acyclic graph. In accordance with some embodiments, the hash-based directed acyclic graph may be adapted to encode a data set and may have a plurality of pointers and a plurality of nodes wherein at least one node has multiple parents. Block 986 represents receiving a plurality of proofs about the hash-based directed acyclic graph. In accordance with some embodiments, the plurality of proofs may be such that a combination of the plurality of proofs does not reveal information about which nodes have multiple parents, each proof comprising a trace from one of the plurality of nodes to at least one different node. In some embodiments, the trace may comprise the identities of the nodes and pointers traversed. Further, block 988 represents verifying the proofs and block 990 represents ending the method 980.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A computer-implemented method of committing to a data set, comprising:

forming, by said computer, a directed acyclic graph adapted to encode the data set, the directed acyclic graph having a plurality of pointers and a plurality of nodes wherein at least one node has multiple parents from the directed acyclic graph, the directed acyclic graph having at least one root node and a plurality of leaf nodes;

committing to the directed acyclic graph to produce, by said computer, a committed-to data set; and producing, by said computer, a plurality of proofs about the committed-to data set such that a combination of the plurality of proofs does not reveal information about which nodes have multiple parents, each proof comprising a trace from one of the plurality of nodes to at least one different node, the trace comprising the identities of the nodes and pointers traversed, wherein producing a plurality of proofs comprises producing multiple proofs each showing that a different given element is not present in the committed-to data set and limiting a number of these proofs produced per committed-to data set.

2. The method of claim 1, comprising using intrinsic references in the directed acyclic graph as pointers.

3. The method of claim 1, comprising forming a hash-based directed acyclic graph.

4. The method of claim 3, comprising committing to the hash-based directed acyclic graph by sending hashes of at least one root node.

5. The method of claim 1, wherein at least one of the pointers is blinded.

6. The method of claim 1, wherein at least one pointer holds ordinary commitments.

7. The method of claim 6, wherein the ordinary commitments are commitments to hashes, the hashes relating to the nodes being pointed to.

8. The method of claim 1, wherein at least one of the nodes contains a random value.

9. The method of claim 1, comprising forming a prefix directed acyclic graph.

10. The method of claim 1, comprising encoding information about the data set primarily in the plurality of leaf nodes.

11. The method of claim 1, wherein at most a specified number of elements may be proved to be in the committed-to data set.

12. The method of claim 1, wherein the trace is from a root node to a one of the plurality of leaf nodes.

13. A computer-implemented method of determining whether an item of information is included in a data set, the method configured to be stored on a tangible medium and comprising:

grouping, by said computer, binary values into a set comprising values that have the same first K bits (($1 \leq K$)), wherein the set comprises a first subset of values associated with encoded items of information and a second subset of values not associated with encoded items of information; and providing, by said computer, a proof that is used to test whether a value in the set is associated with the item of information, wherein K is selected such that a different proof can be used for each value in the set, wherein providing the proof comprises producing multiple proofs each showing that a different given element is not present in the group and limiting a number of these proofs produced per set.

14. The method of claim 13, further comprising representing the values in the set as a hierarchical data structure comprising pointers that map each member of the set from a root node of the data structure to a leaf node of the data structure.

15. The method of claim 14, wherein the hierarchical data structure comprises a hashed directed acyclic graph.

16. The method of claim 14, wherein K is selected such that each value in the set is associated with a different combination of pointers.

17. The method of claim 14, further comprising associating the values in the second subset with a single leaf node.

18. The method of claim 14, wherein different combinations of pointers map members of the second subset from the root node to the same leaf node.

19. The method of claim 14, wherein the trace comprises a hash determined using a hash function with arguments that comprise a pointer associated with the value being tested for membership.

20. The method of claim 19, wherein the arguments of the hash function further comprise a random number associated with the pointer.

21. The method of claim 13, further comprising assigning a null value to the values in the second subset.

22. The method of claim 13, further comprising applying a random permutation to the values prior to the grouping of the values.

23. The method of claim 13, further comprising applying a limit to the size of the first subset.

24. The method of claim 13, further comprising assigning each member of the first subset a unique item number.

25. A system comprising
a bus;
a processor coupled to the bus; and
a memory unit coupled to the bus, said memory unit containing instructions configured to be stored on a tangible medium that when executed provide a computational method comprising:
encoding items of information as a first subset of a set of binary L-bit values, wherein the complement of the first subset forms a second subset of binary L-bit values not associated with encoded items of information;
identifying a group of values comprising the values in the first and second subsets that have the same first K kits ($1 \leq K \leq L$); and
providing a proof that is used to test whether a value is associated with the item of information, wherein K is selected such that a different proof can be used for each value in the group,
wherein providing the proof comprises producing multiple proofs each showing that a different given element is not present in the group and limiting a number of these proofs produced per group.

26. The system of claim 25, wherein the values in the group are represented as a hierarchical data structure comprising pointers that map each member of the group from a root node to a leaf node of the data structure.

27. The system of claim 26, wherein the hierarchical data structure comprises a hashed directed acyclic graph.

28. The system of claim 26, wherein K is selected such that each value in the group is associated with a different combination of pointers.

29. The system of claim 26, wherein the values in the group that are not associated with encoded items of information are associated with a single leaf node.

30. The system of claim 26, wherein different combinations of pointers map the values in the group that are not associated with encoded items of information from the root node to the same leaf node.

31. The system of claim 26, wherein the proof comprises a hash determined using a hash function with arguments that comprise a pointer associated with the value being tested for membership.

32. The system of claim 31, wherein the arguments of the hash function further comprise a random number associated with the pointer.

33. The system of claim 25, wherein a random permutation is applied to the values before identifying the group.

34. The system of claim 25, wherein the size of the first subset is limited.

35. The system of claim 25, wherein each member of the first subset is assigned a unique item number.

36. A non-transitory computer readable medium containing application instructions where the instructions, when executed, effect a method of determining whether an item of information is included in a data set, the method comprising:
accessing binary L-bit values associated with encoded items of information;
grouping the binary values into a set comprising values that have the same first K bits (($1 \leq K \leq L$)), the set also comprising the L-bit values not associated with encoded items of information; and
providing a proof that is used to test whether a value in the set is associated with the item of information, wherein K is selected such that a different proof can be used for each value in the set,
wherein providing the proof comprises producing multiple proofs each showing that a different given element is not present in the group and limiting a number of these proofs produced per set.

37. The application instructions of claim 26, wherein the method further comprises representing the values in the set as a hierarchical data structure comprising pointers that map each member of the set from a node of the data structure to a leaf node of the data structure.

38. The application instructions of claim 37, wherein the hierarchical data structure comprises a hashed directed acyclic graph.

39. The application instructions of claim 37, wherein K is selected such that each value in the set is associated with a different combination of pointers.

40. The application instructions of claim 37, wherein the values in the set that are not associated with encoded items of information are associated with a single leaf node.

41. The application instructions of claim 37, wherein different combinations of pointers map the values in the set that are not associated with encoded items of information to the same leaf node.

42. The application instructions of claim 37, wherein the proof comprises a hash determined using a hash function with arguments that comprise a pointer associated with the value being tested for membership.

43. The application instructions of claim 42, wherein the arguments of the hash function further comprise a random number associated with the pointer.

44. The application instructions of claim 36, wherein the method further comprises applying a random permutation to the values prior to the grouping of values.

45. A system for determining whether an item of information is included in a data set, the system comprising:
means for encoding items of information as binary values;
means for grouping the binary values into a set comprising values that have the same first K bits ($1 \leq K$), wherein the set comprises a first subset of values associated with encoded items of information and a second subset of values not associated with encoded items of information; and means for providing a proof that is used to test whether a value in the set is associated with the item of information, wherein K is selected such that a different proof can be used for each value in the set, wherein providing the proof comprises producing multiple proofs each showing that a different given element is not present in the group and limiting a number of these proofs produced per set.

46. The system of claim 45, further comprising means for representing the values in the set as a hierarchical data structure comprising pointers that map each member of the set from a root node of the data structure to a leaf node of the data structure.

47. The system of claim 45, further comprising means for randomly permuting the values prior to the grouping of values.

48. The system of claim 45, further comprising means for limiting the size of the first subset.

49. The system of claim 45, further comprising means for assigning each member of the first subset a unique item number.

* * * * *

UNITED STATES PATENT AND TRADEMARK OFFICE
CERTIFICATE OF CORRECTION

PATENT NO.         : 7,831,573 B2
APPLICATION NO.    : 10/934557
DATED              : November 9, 2010
INVENTOR(S)        : Mark David Lillibridge et al.

Page 1 of 1

It is certified that error appears in the above-identified patent and that said Letters Patent is hereby corrected as shown below:

In column 12, line 45, in Claim 12, after "to" delete "a".

In column 12, line 45, in Claim 12, after "the" delete "plurality of".

In column 12, line 51, in Claim 13, delete "$((1 \leq K),$" and insert -- $(1 \leq K)$, --, therefor.

In column 13, line 42, in Claim 25, delete "kits" and insert -- bits --, therefor.

In column 14, line 33, in Claim 37, delete "claim 26," and insert -- claim 36, --, therefor.

Signed and Sealed this
Eighth Day of March, 2011

David J. Kappos
*Director of the United States Patent and Trademark Office*